US010672348B2

(12) United States Patent
Lin et al.

(10) Patent No.: US 10,672,348 B2
(45) Date of Patent: Jun. 2, 2020

(54) DISPLAY DEVICE AND DRIVE METHOD THEREOF

(71) Applicant: ASUSTeK COMPUTER INC., Taipei (TW)

(72) Inventors: Ching-Hsin Lin, Taipei (TW); Yaw-Huei Chiou, Taipei (TW); Yueh-Huah Lee, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 0 days.

(21) Appl. No.: 16/182,816

(22) Filed: Nov. 7, 2018

(65) Prior Publication Data
US 2019/0156766 A1 May 23, 2019

Related U.S. Application Data

(60) Provisional application No. 62/588,948, filed on Nov. 21, 2017.

(30) Foreign Application Priority Data

Oct. 18, 2018 (CN) .......................... 2018 1 1213529

(51) Int. Cl.
G09G 3/34 (2006.01)
G06F 3/041 (2006.01)
(52) U.S. Cl.
CPC ........... G09G 3/3406 (2013.01); G06F 3/041 (2013.01); G09G 2320/064 (2013.01);
(Continued)
(58) Field of Classification Search
CPC ......... G09G 3/3406; G09G 2320/0646; G09G 2354/00; G09G 2320/0606; G09G 2320/064; G06F 3/041
See application file for complete search history.

(56) References Cited

U.S. PATENT DOCUMENTS 8,578,192 B2    11/2013  Vasquez et al.
2005/0134547 A1*  6/2005  Wyatt ................. G09G 3/3406
                                                345/102
2016/0117978 A1*  4/2016  Shikata ............... G09G 3/2096
                                                345/690

FOREIGN PATENT DOCUMENTS

CN    101620840 A    1/2010
CN    101789218 A    7/2010
CN    203366708 U    12/2013

* cited by examiner

Primary Examiner — Robert J Michaud
(74) Attorney, Agent, or Firm — McClure, Qualey & Rodack, LLP

(57) ABSTRACT

A display device includes a display, a driver, a memory, and a controller. The display includes a display panel and a backlight unit with a plurality of light-emitting elements to display an image. The driver is electrically connected to the display to transmit a backlight control signal to the backlight unit. The memory stores a plurality of adjustment instructions, and each adjustment instruction includes a drive frequency and a control parameter. The controller is electrically connected to the display, the driver, and the memory. The controller is configured to determine a drive frequency and a control parameter corresponding to the drive frequency in the memory according to a frequency adjustment signal, and then adjust the backlight control signal according to the control parameter, to change a duty cycle of the backlight control signal, so that a refresh rate of the backlight unit meets a requirement of a user.

9 Claims, 3 Drawing Sheets

(52) U.S. Cl.
CPC ............... *G09G 2320/0606* (2013.01); *G09G 2320/0646* (2013.01); *G09G 2354/00* (2013.01)

DISPLAY DEVICE AND DRIVE METHOD THEREOF

CROSS-REFERENCE TO RELATED APPLICATION

This application claims the priority benefit of U.S. Provisional Application Ser. No. 62/588,948, filed on Nov. 21, 2017 and China Application No. 201811213529.6, filed on Oct. 18, 2018. The entirety of the above-mentioned patent applications is hereby incorporated by reference herein and made a part of the specification.

BACKGROUND OF THE INVENTION

Field of the Invention

This disclosure relates to a display device.

Description of the Related Art

The advantages of a liquid crystal display (LCD) include high definition, small size, light weight, low drive voltage, and low power consumption. Therefore, the LCD is widely applied to various consumer electronics and becomes the mainstream of a display.

Because a liquid crystal is a non-self-luminous element, the display that utilizes liquid crystal material is equipped with a backlight unit. When a passing rate of the light is adjusted by changing a torsion angle of the liquid crystal via controlling the voltage, an image is formed. Therefore, a drive method of the backlight unit obviously affects the display quality of the LCD.

Currently, in various types of display devices, a refresh rate of a backlight unit is fixed and cannot be adjusted by a user. For example, an animator cannot easily change a refresh rate of a backlight unit to compare display effects presented by animations of a display device in different refresh rate states. Therefore, the flexibility of the display device in use is limited.

BRIEF SUMMARY OF THE INVENTION

This disclosure provides a display device, including a display, a driver, a memory, and a controller. The display includes a display panel and a backlight unit. The display panel is configured to display an image. The image has a plurality of adjustment options, and when one of the adjustment options is triggered, the display panel generates a frequency adjustment signal. The backlight unit includes a plurality of light-emitting elements. The driver is electrically connected to the display, and is configured to transmit a backlight control signal to the backlight unit. The memory is configured to store a plurality of adjustment instructions, where each adjustment instruction includes a drive frequency and a control parameter corresponding to the drive frequency. The controller is electrically connected to the display, the driver, and the memory. The controller determines a drive frequency in the memory according to the frequency adjustment signal, and then adjusts the backlight control signal according to the control parameter, to change a duty cycle of the backlight control signal.

This disclosure further provides a drive method. The drive method includes the following steps: generating an image function menu by a display according to a display signal, and driving a plurality of light-emitting elements in a backlight unit according to a backlight control signal; generating a frequency adjustment signal by the display; determining a drive frequency and a control parameter corresponding to the drive frequency from a plurality of adjustment instructions stored in a memory by a controller according to the frequency adjustment signal; and adjusting a duty cycle of the backlight control signal according to the control parameter by the driver.

After receiving the frequency adjustment signal, the display device of this disclosure determines the control parameter from the memory, and adjusts the duty cycle of the backlight control signal according to the control parameter, so that a refresh rate of the backlight unit is adjusted according to an application manner or a requirement of a user.

DETAILED DESCRIPTION OF THE EMBODIMENTS

The following discloses a plurality of implementations of this disclosure with reference to the accompanying drawings, and for the sake of clear illustration, many details in practice are illustrated in the following description. However, it should be understood that the details in practice should not be used to limit this disclosure. That is, in some implementations of this disclosure, the details in practice are unnecessary. In addition, for simplicity of the accompanying drawings, some known conventional structures and elements are represented in a simple indicative way in the accompanying drawings.

In this disclosure, when an element is referred to as "connected" or "coupled", it may be "electrically connected" or "electrically coupled". The "connection" or "coupling" may also be used to represent mutual matching or interaction between two or more elements. In addition, although the expressions such as "first" and "second" are used in this disclosure to describe different elements, the expressions are only used to distinguish elements or operations described by using the same technical expressions. Unless clearly specified in the context, the expressions do not particularly mean or imply an order or a sequence, or are not used to limit the invention.

Figure 1:
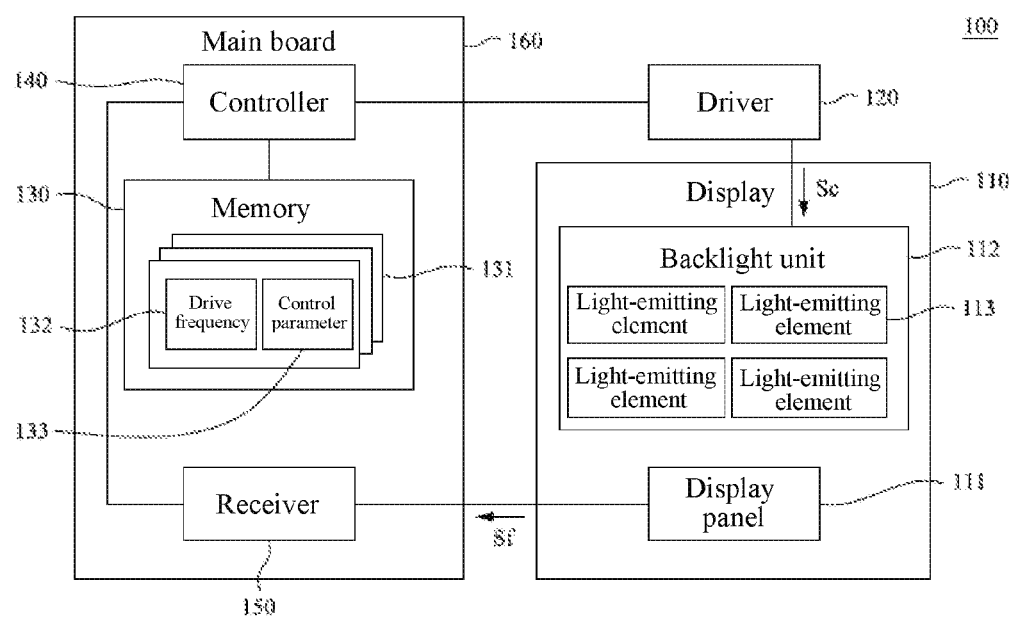
FIG. 1 is a schematic diagram of a display device according to some embodiments of this disclosure.

FIG. 1 is a schematic diagram of a display device 100 according to some embodiments of this disclosure. This disclosure relates to a display device 100 and a drive method thereof, and the display device 100 includes a display 110, a driver 120, a memory 130, and a controller 140. The display 110 includes a display panel 111 and a backlight unit 112. The display panel 111 includes a plurality of display elements such as a pixel circuit and a liquid crystal molecule. Because a person skilled in the art understands structures of the pixel circuit and the liquid crystal molecule, details are not described herein. In some embodiments, the display 110 is a "direct type" liquid crystal display device, and the display panel 111 displays an image according to a display signal.

The backlight unit 112 includes a plurality of light-emitting elements 113, positions of the light-emitting elements 113 correspond to the display elements of the display panel 111, and the light-emitting element is configured to cast light in a direction of the display panel 111. In some embodiments, the light-emitting element 113 is a light-emitting diode. In some embodiments, the light-emitting element 113 is a light-emitting diode string, but in some other embodiments, the type of the light-emitting element 113 is not limited to the light-emitting diode.

Figure 2:
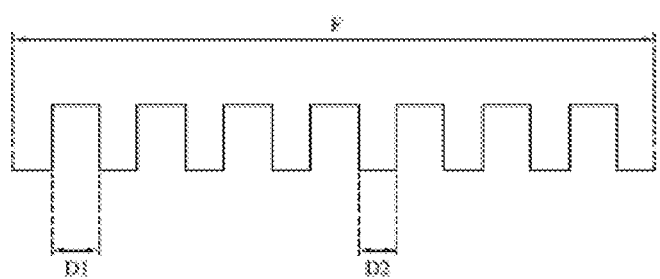
FIG. 2 is a schematic diagram of a frequency adjustment signal according to some embodiments of this disclosure.
Figure 3:
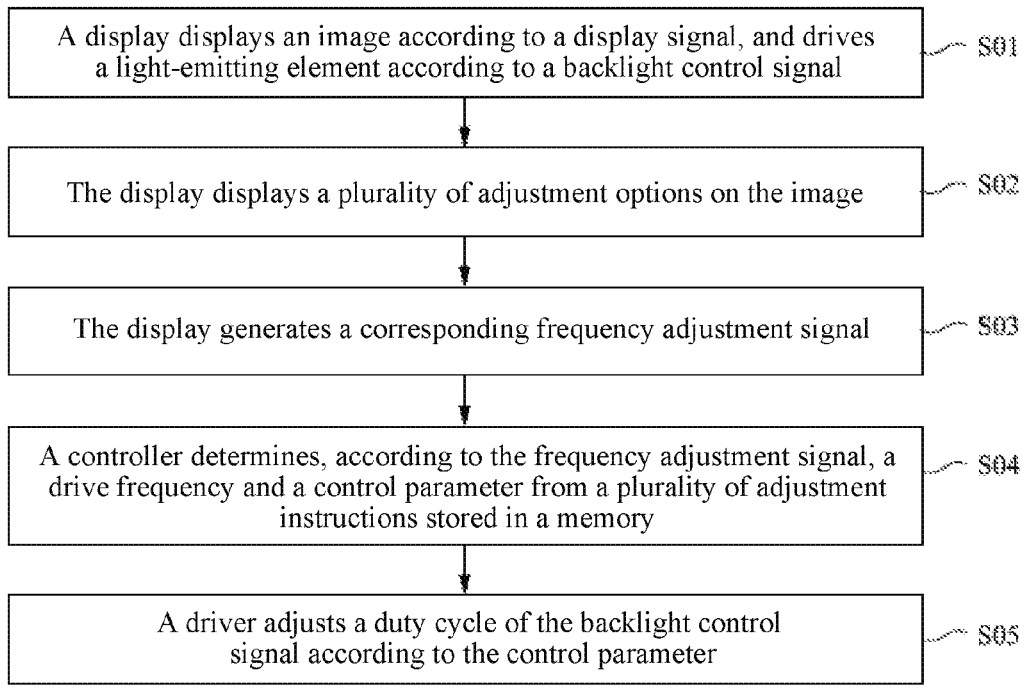
FIG. 3 is a flowchart of a drive method according to some embodiments of this disclosure.

The driver 120 is electrically connected to the display 110, and is configured to transmit a backlight control signal Sc to the backlight unit 112. As shown in FIG. 2, in this embodiment, the backlight control signal Sc is a pulse width modulation (PWM) signal. The PWM signal is formed by a plurality of pulse signals. In an image period F (for example, an update time of a frame of images), a ratio of a pulse duration D1 of a pulse signal to a total length of the image period F is referred to as a "duty cycle". The duty cycle directly affects a refresh rate of the backlight unit 112.

The memory 130 is configured to store a plurality of adjustment instructions 131. Each adjustment instruction 131 includes a drive frequency 132 and a control parameter 133. In an embodiment, one drive frequency 132 is "240 Hz" (that is, a refresh rate of the backlight unit 112 to be adjusted by a user), and one control parameter 133 is 25% (for example, the duty cycle). In some other embodiments, the control parameter 133 further includes a frequency signal, a voltage signal, and the like.

The controller 140 is electrically connected to the display 110, the driver 120, and the memory 130. In some embodiments, the controller 140 sends the display signal to the display panel 111. That is, the controller 140 is configured to drive the display panel 111, and the driver 120 is configured to drive the backlight unit 112. However, in some other embodiments, the display signal is also sent by the driver 120.

The image displayed by the display panel 111 has a plurality of adjustment options, and each adjustment option corresponds to a frequency adjustment signal. In an embodiment, the adjustment options are separately buttons of "120 Hz", "240 Hz", "480 Hz", and "960 Hz". When the adjustment option is triggered (for example, clicked), the controller 140 receives a corresponding frequency adjustment signal Sf sent from the display panel 111, and is configured to determine the drive frequency 132 in the memory 130 according to the frequency adjustment signal Sf.

Then, the backlight control signal Sc is adjusted according to the control parameter 133, to change a duty cycle of the backlight control signal Sc. In some embodiments, the frequency adjustment signal Sf is received by the display 110 and then sent to the controller 140.

In an embodiment, when a user triggers an adjustment option corresponding to "120 Hz", to input the corresponding frequency adjustment signal Sf, the controller 140 determines the adjustment instruction 131 with a 200 Hz drive frequency from all adjustment instructions 131 in the memory 130, and then determines the control parameter 133. The controller 140 transmits the control parameter 133 to the driver 120, so that the driver 120 adjusts the backlight control signal Sc according to the control parameter 133. In some embodiments, the controller 140 is disposed on a processing chip (for example, a scaler) of the display device 100.

Based on this, the refresh rate of the backlight unit 112 is adjusted by changing the duty cycle of the backlight control signal Sc according to different application manners or users' requirements, to compare display effects of the display device 100 in different refresh rates. In addition, because the adjustment instruction 131 is pre-stored in the memory 130, the controller 140 does not need to calculate the corresponding duty cycle in real time according to the frequency adjustment signal Sf. Therefore, the smooth operation of the display device 100 is ensured.

In some embodiments, the control parameter 133 is used to adjust the pulse duration D1 (that is, an enabled time length of each pulse signal in the PWM signal) of the backlight control signal Sc, to change the duty cycle of the backlight control signal Sc. In some other embodiments, the control parameter 133 is used to adjust a pulse interval D2 (that is, an interval length of each pulse signal in the PWM signal) of the backlight control signal Sc.

In addition, when the light-emitting element 113 is a light-emitting diode string, after receiving the control parameter 133, the driver 120 sends the backlight control signal Sc to each light-emitting diode string sequentially, to sequentially drive the light-emitting elements 113. In some embodiments, the driver 120 synchronizes all backlight control signals Sc, to ensure that a drive time of the adjusted backlight control signal Sc does not exceed an image period F of an original same frame.

To clearly describe the implementations of the display device 100 of this disclosure, a drive method of the display device 100 is described herein as follows. As shown in FIG. 2, in some embodiments, the drive method includes the following steps: First, in step S01, a display 110 displays an image according to a display signal, and drives a light-emitting element 113 in a backlight unit 112 according to a backlight control signal Sc.

Then, in step S02, the display 110 displays a plurality of adjustment options on the image, where the adjustment options separately correspond to adjustment instructions 131 stored in a memory 130. In an embodiment, the adjustment options are separately buttons of "120 Hz", "240 Hz", "480 Hz", and "960 Hz". In step S03, when a user triggers one of the adjustment options, the display 110 generates a corresponding frequency adjustment signal Sf, where the frequency adjustment signal Sf corresponds to at least one of the adjustment options.

In some embodiments, a display panel 111 is a touch-control display panel. Therefore, the user directly clicks the adjustment option on the image, and the display 110 generates the corresponding frequency adjustment signal Sf. In some other embodiments, the display panel also has physical keys, and positions of the physical keys separately correspond to the adjustment options on the image, so that the user presses the corresponding physical keys, to make the display 110 generate the corresponding frequency adjustment signal Sf.

In step S04, a controller 140 receives the frequency adjustment signal Sf transmitted by the display 110, and determines, according to the frequency adjustment signal Sf, a drive frequency 132 from a plurality of adjustment instructions 131 stored in the memory 130. Then, a control parameter 133 is obtained according to the found drive frequency 132. In some embodiments, the controller 140 and the memory 130 are mounted on a main board 160 in the display device 100, and the controller 140 receives the frequency adjustment signal Sf that transmitted by the display 110 via a receiver 150 on the main board 160.

In step S05, after receiving the control parameter Sf transmitted by the controller 140, a driver 120 adjusts a duty cycle of the backlight control signal Sc according to the control parameter Sf. Then, the adjusted backlight control signal Sc is transmitted to the backlight unit 112, so that a refresh rate of the backlight unit 112 is changed.

By using the foregoing drive method, the display device 100 displays a plurality of groups of preset adjustment options separately corresponding to different driving frequencies 132 on the image, for the user to select. The user selects different adjustment options one by one, and controls the backlight unit 112 of the display device 100 at different driving frequencies. Based on this, by comparing display effects of images presented by the display device 100 in different cases, the user learns an optimal drive frequency suitable for different images. In addition, because the user directly selects the "drive frequency" as the frequency adjustment signal, instead of the brightness or the voltage, the frequency adjustment signal is more intuitive in use, and meets a requirement of the user.

The embodiments of the invention are disclosed above, but the embodiments are not intended to limit the invention. Any person of ordinary skill in the art may make some modifications and changes without departing from the spirit and scope of the invention. Therefore, the protection scope of the invention should be subject to the claims.

What is claimed is:

1. A display device, wherein the display device comprises:
  a display, comprising:
   a display panel, configured to display an image with a plurality of adjustment options, and when one of the adjustment options is triggered, the display panel generates a frequency adjustment signal; and
   a backlight unit, comprising a plurality of light-emitting elements;
  a driver, electrically connected to the display, and configured to transmit a backlight control signal to the backlight unit;
  a memory, configured to store a plurality of adjustment instructions, wherein each adjustment instruction comprises a drive frequency and a control parameter corresponding to the drive frequency; and
  a controller, electrically connected to the display, the driver, and the memory, wherein the controller determines the drive frequency in the memory according to the frequency adjustment signal, and then adjusts the backlight control signal according to the control parameter, to change a duty cycle of the backlight control signal;
  wherein the adjustment options separately correspond to the adjustment instructions;
  wherein the frequency adjustment signal corresponds to at least one of the adjustment options.

2. The display device according to claim 1, wherein the control parameter is used to adjust a pulse duration or a pulse interval of the backlight control signal.

3. The display device according to claim 1, wherein the backlight control signal is a pulse width modulation signal.

4. The display device according to claim 1, wherein the light-emitting elements are light-emitting diode strings.

5. The display device according to claim 1, wherein the display panel is a touch-control display panel.

6. A drive method, wherein the drive method comprises:
  displaying an image by a display, and driving a plurality of light-emitting elements in a backlight unit according to a backlight control signal;
  generating a frequency adjustment signal by the display;
  determining a drive frequency and a control parameter corresponding to the drive frequency from a plurality of adjustment instructions stored in a memory by a controller according to the frequency adjustment signal;
  adjusting a duty cycle of the backlight control signal according to the control parameter by a driver; and
  displaying a plurality of adjustment options on the image by the display, wherein the adjustment options separately correspond to the adjustment instructions;
  wherein when one of the adjustment options is triggered, the display generates the frequency adjustment signal, wherein the frequency adjustment signal corresponds to at least one of the adjustment options.

7. The drive method according to claim 6, wherein the control parameter is used to adjust a pulse duration or a pulse interval of the backlight control signal.

8. The drive method according to claim 6, wherein the backlight control signal is a pulse width modulation signal.

9. The drive method according to claim 6, wherein the drive method further comprises:
  transmitting the backlight control signal to the light-emitting elements sequentially by the driver.

* * * * *